(12) United States Patent  
Inoko

(10) Patent No.: US 7,403,339 B2  
(45) Date of Patent: Jul. 22, 2008

(54) ZOOM LENS AND IMAGE PROJECTION APPARATUS HAVING THE SAME

(75) Inventor: Kazuhiro Inoko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/619,852

(22) Filed: Jan. 4, 2007

(65) Prior Publication Data

US 2007/0103793 A1 May 10, 2007

Related U.S. Application Data

(63) Continuation of application No. 11/360,232, filed on Feb. 22, 2006, now Pat. No. 7,190,528.

(30) Foreign Application Priority Data

Feb. 22, 2005 (JP) ............................. 2005-045456

(51) Int. Cl.
*G02B 15/14* (2006.01)
(52) U.S. Cl. .................. 359/680; 359/649; 359/683; 359/713; 359/762
(58) Field of Classification Search ......... 359/649–651, 359/680–683, 686, 689, 691, 713–717, 762
See application file for complete search history.

(56) References Cited

U.S. PATENT DOCUMENTS 4,124,274 A   11/1978  Tanaka et al.
6,580,564 B2  6/2003   Nagahara
6,888,682 B2  5/2005   Kawakami
7,190,528 B2 * 3/2007  Inoko ..................... 359/649
2001/0050818 A1 12/2001 Wada et al.

FOREIGN PATENT DOCUMENTS

| CN | 200410007929.3 | 9/2004 |
| JP | 10-186235 | 7/1998 |
| JP | 2001-235679 | 8/2001 |
| JP | 2002-357771 | 12/2002 |
| JP | 2004-226803 | 8/2004 |

OTHER PUBLICATIONS

First Office Action issued on May 11, 2007 for Chinese patent application No. 200610004104.5 (with English translation).

* cited by examiner

*Primary Examiner*—Evelyn A. Lester
(74) *Attorney, Agent, or Firm*—Morgan & Finnegan, LLP

(57) ABSTRACT

A zoom lens comprises a plurality of lens units including a first lens unit disposed most adjacent to an enlargement side and having negative refractive power, wherein one or more lens units of the plurality of lens units are moved in the direction of the optical axis thereof during magnification change, and wherein the first lens unit includes a 1-1st lens unit comprising at least one lens of negative refractive power and moved during focusing and a 1-2nd lens unit having positive refractive power, and fixed during focusing.

2 Claims, 7 Drawing Sheets

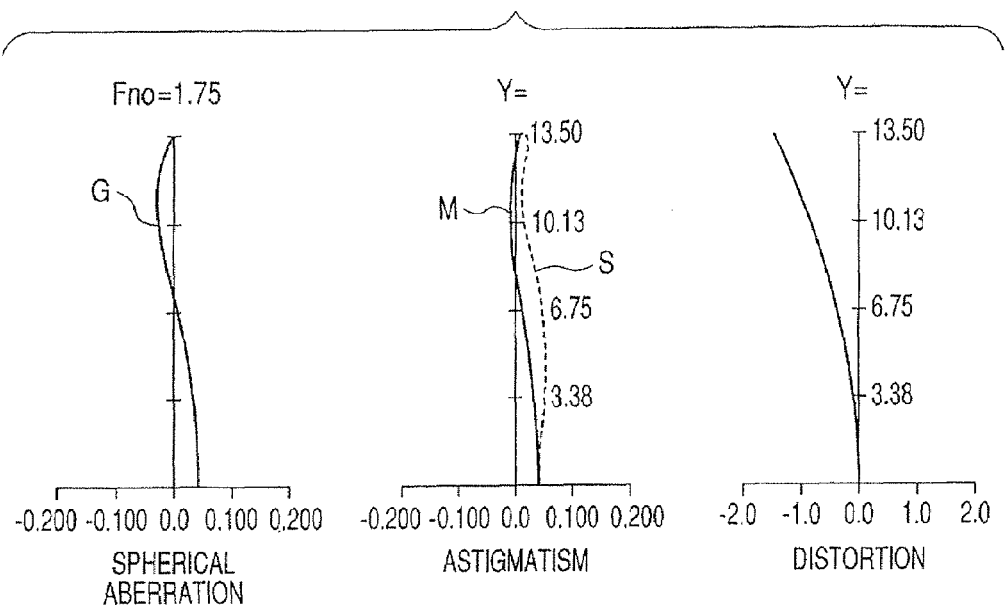
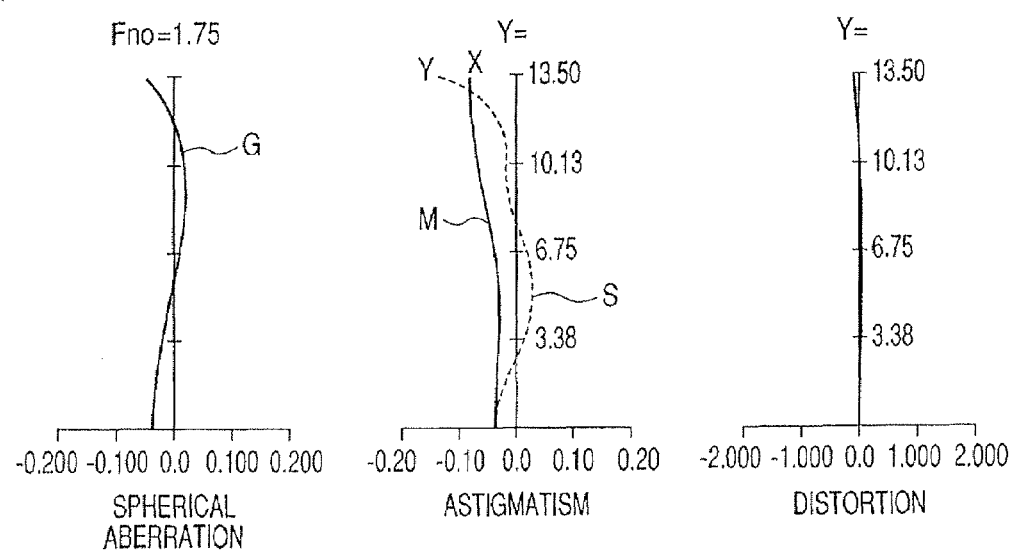

ZOOM LENS AND IMAGE PROJECTION APPARATUS HAVING THE SAME

This application is a continuation of application Ser. No. 11/360,232 now U.S. Pat. No. 7,190,528, filed Feb. 22, 2006, which is incorporated by reference in its entirety.

BACKGROUND OF THE INVENTION

1. Field of the Invention

This invention relates to a zoom lens and an image projection apparatus having the same, and is suitable for a liquid crystal projector having, for example, a long back focal length, and having high optical performance at various projection magnifications.

2. Related Background Art

There have heretofore been proposed various liquid crystal projectors (image projection apparatuses) using a display element such as a liquid crystal display element to project an image formed on the display element onto a screen surface.

Characteristics mentioned below are required of a projection lens for use in these liquid crystal projectors.

In color liquid crystal projection of a three-element type using three liquid crystal display elements, generally, light from a white source is separated into red, green and blue colors by a color separating optical system, and these color lights are directed to the respective liquid crystal display elements, and the lights emerging from those liquid crystal display elements are combined by a color combining optical system and are made to be incident on a projection lens.

In that projection, the projection lens must have a back focal length of a certain constant length so as to provide a space between each liquid crystal display element and the projection lens for disposing therein a prism or the like for combining the color lights after transmitted through the liquid crystal display elements.

If the angles of the light beams incident from the liquid crystal display elements onto the color combining optical systems change, the spectral transmittance of the color combining optical system changes in conformity therewith, and the brightness of each color in the projected image is changed depending on the angle of view and the image becomes an image difficult to see. Therefore, in order to lessen the influence of the dependence on the angle, the color combining optical system must be a so-called telecentric optical system of which the pupil on the liquid crystal display element (reduction conjugate surface) side is substantially at infinity.

When the pictures (images) of the liquid crystal display elements of the three colors are combined and projected onto a screen, pixels of the respective colors must be superposed one upon another on the entire area of the screen so that high resolution feeling may not be spoiled by, for example, doubly displaying characters or the like.

Therefore, color misregistration (chromatic aberration of magnification) occurring in the projection lens must be well corrected in a visible light zone.

Distortion must be well corrected so that the projected image may not be distorted and difficult to see.

The projection lens must be a bright projection lens of small Fno (F number) so as to be capable of efficiently introducing the light from the light source.

The projector carrying a compact liquid crystal panel thereon must be compact and light in weight to attach importance to portability and mobility.

A good projected image must be obtained at various projection distances, that is, the aberration fluctuation during focusing must be small.

As a zoom lens adapted to satisfy these requirements, there has been a zoom lens for a projector of which the focusing is effected with only some of optical elements in lens units moved (Japanese Patent Application Laid-open No. H10-186235, U.S. Pat. No. 6,580,564 and Japanese Patent Application Laid-open No. 2004-226803).

Japanese Patent Application Laid-open No. H10-186235 discloses a five-unit zoom lens comprising, in succession from a screen side, lens units of negative, positive, positive, negative and positive refractive power and in which the rearmost (projected image side) positive lens in a first lens unit comprising four positive, negative, negative and positive lenses is fixed and three lenses on the screen side are moved to thereby effect focusing.

U.S. Pat. No. 6,580,564 and Japanese Patent Application Laid-open No. 2004-226803 disclose a five-unit zoom lens comprising, in succession from a screen side, lens units of negative, positive, positive, negative and positive refractive power and in which a first lens unit is composed of two lens elements having negative refractive power, and the interval between these lens elements is changed to thereby effect focusing. Both of these are such that a positive lens is included in a focusing element and weakens the refractive power of the entire focusing element.

Also, as a projection lens for a liquid crystal projector, there is proposed a six-unit zoom lens comprising, in succession from an enlargement conjugate side (this term is interchangeably used herein in the same meaning as a front side and an enlarging side), six lens units as a whole by the arrangement of first to sixth lens units of negative, positive, positive, negative, positive (or negative) and positive refractive power, and in which a predetermined lens unit of them is appropriately moved to thereby effect zooming (U.S. Publication No. US-2001-050818).

In this six-unit zoom lens, during zooming from a wide angle end to a telephoto end, in order that with the first and sixth lens units as being fixed, the second to fifth lens units therebetween may all be moved to a reduction conjugate side (this term is interchangeably used herein in the same meaning as a rear side and a reduction side), the full length of the lens is kept constant during zooming. Also, this zoom lens is a zoom lens in which distortion and chromatic aberration during zooming are lessened and which is telecentric on the reduction conjugate side. In the configuration disclosed in this U.S. Publication No. US-2001-050818, there is disclosed that the first lens unit is composed of three positive, negative and negative lenses from the enlargement conjugate side, and this first lens unit is driven to thereby effect focus adjustment.

Generally, as a method of suppressing the fluctuations of various aberrations when focusing is effected, there is a method of strengthening the refractive power of a focusing lens unit as far as possible, and lessening the movement amount of the focusing lens to the utmost. In the aforementioned Japanese Patent Application Laid-open No. H10-186235, U.S. Pat. No. 6,580,564 and Japanese Patent Application Laid-open No. 2004-226803, in the lens construction in the first lens unit, the focusing lens unit is not composed of only negative lenses and therefore, there has been the tendency that the refractive power of the focusing lens unit becomes weak, and the movement amount thereof during focusing becomes great and the fluctuations of various aberrations become great.

Further, it is often the case with the lens construction of a zoom lens used in a projector that it is made into a retrofocus type in order to obtain a long back focal length, and lens units having strong positive refractive power are disposed on a reduction side in order to make the reduction side telecentric.

The zoom lens of such a construction, however, has the tendency that the asymmetry of the entire lens system increases for example, as chromatic aberration of magnification in blue occurs more under (direction of an optical axis) than that in green.

Also, the smaller becomes the number of lenses, the more increases the refractive power of each lens and therefore, particularly a negative lens located more adjacent to the reduction side than a stop becomes liable to cause chromatic aberration of magnification of a high order in the over direction. Also, the greater becomes the zoom ratio, the greater the fluctuation of chromatic aberration of magnification from the wide angle end to the telephoto end also tends to become.

SUMMARY OF THE INVENTION

It is an object of the present invention to provide a zoom lens suitable for use, for example, in a liquid crystal projector which achieves the downsizing of an entire lens system, and yet well corrects various aberrations resulting from focusing, and has good optical performance over the whole of a projection distance.

It is another object of the present invention to provide a zoom lens suitable for use in a projector which corrects chromatic aberration of magnification well and can easily obtain high optical performance.

The zoom lens of the present invention comprises:

a plurality of lens units including a first lens unit disposed most adjacent to an enlargement side and having negative refractive power;

at least one of the plurality of lens units being moved in the direction of the optical axis thereof during a magnification change;

said first lens unit including:

a 1-1st lens unit comprising at least one lens having negative refractive power, and moved during focusing; and a 1-2nd lens unit having positive refractive power, and fixed during focusing.

The zoom lens of the present invention comprises:

a first lens unit disposed most adjacent to an enlargement side, and having negative refractive power;

a last lens unit disposed most adjacent to a reduction side, and having positive refractive power; and one or more lens units moved in the direction of the optical axis thereof during zooming (magnification change);

wherein the following condition is satisfied, $$32 < vdR - vdF$$

where vdF is the Abbe number of the material of which a first lens in the first lens unit disposed most adjacent to the enlargement side has negative refractive power is made, and vdR the Abbe number of the material of which the last lens in said last lens unit which is disposed most adjacent to the reduction side has positive refractive power is made.

BRIEF DESCRIPTION OF THE DRAWINGS

FIG. 9 shows aberrations at the wide angle end of a zoom lens according to Numerical Embodiment 3.

FIG. 10 shows aberrations at the telephoto end of the zoom lens according to Numerical Embodiment 3.

DESCRIPTION OF THE PREFERRED EMBODIMENTS

Figure 1:
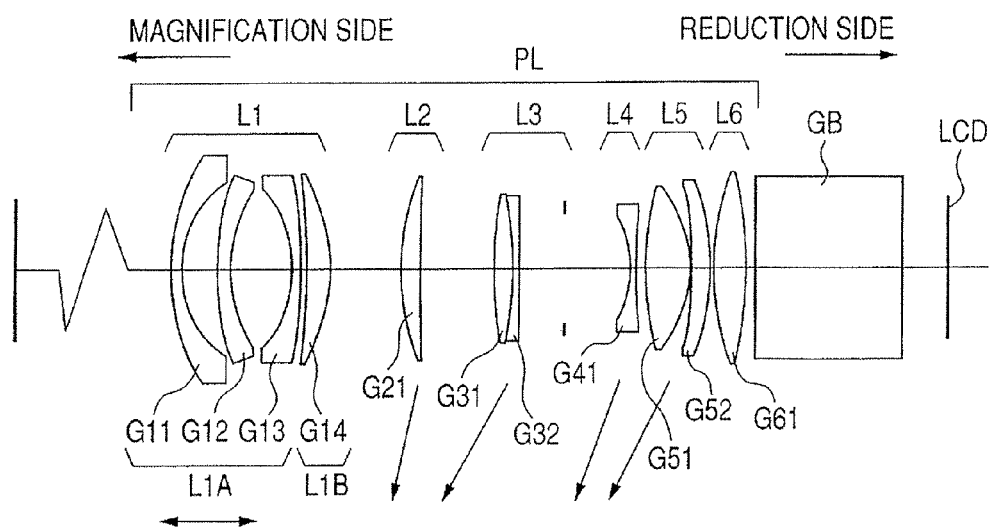
FIG. 1 is a schematic view of the essential portions of an image projection apparatus using a zoom lens according to Embodiment 1.

An embodiment of the present invention can be described as follows.

A zoom lens according to the embodiment is provided with a plurality of lens units including a lens unit GF disposed on the foremost side (magnifying side) and having negative refractive power (optical power), and one or more other lens units of the plurality of lens units than the lens unit GF are moved in the direction of the optical axis thereof to thereby effect zooming, and project image information disposed on a rearward side (reduction side) onto a predetermined surface. At this time, the lens unit GF is characterized by comprising a lens unit A having negative refractive power moved during focusing and a lens unit B having positive refractive power immovable during focusing. Herein, a lens unit not only means a plurality of lenses, but even a single lens is also referred to as a lens unit.

At this time, the lens unit A is composed of only a lens of negative refractive power.

Thus, during focusing, only lenses having negative refractive power in the first lens unit are moved to thereby heighten the refractive power of a focusing element, and decrease the movement amount of a focusing lens unit, and minimize the fluctuations of various aberrations, thereby lessening a change in optical performance due to the difference in projection distance.

A zoom lens according to another embodiment is provided with a plurality of lens units including a lens unit GF disposed on the foremost side and having negative refractive power (optical power), and a lens unit GR disposed on the rearmost side and having positive refractive power (optical power), and one or more other lens units of the plurality of lens units than the lens unit GF and the lens unit GR are moved in the direction of the optical axis thereof to thereby effect zooming, and project image information disposed on a rearward side onto a predetermined surface. At this time, a lens GFa on the foremost side of the lens unit GF has negative refractive power, and a lens GRb on the rearmost side of the lens unit GR has positive refractive power, and this zoom lens is characterized by satisfying the condition that $$32 < vdR - vdF \qquad (1)$$

where vdF and vdR represent the Abbe numbers of the materials of which the lens GFa and the lens GRb are made, respectively.

Also, under such a construction, the lens system GF is characterized by being constituted, in succession from the front side to the rear side, by a lens unit A having negative refractive power moved during focusing, and a lens unit B of positive refractive power fixed during focusing.

Further, the lens unit A is composed of only lenses having negative refractive power.

As described above, the lens GFa and the lens GRb are constructed so that the Abbe numbers of the materials thereof may satisfy the conditional expression (1), whereby chromatic aberration of magnification is corrected well.

Particularly by satisfying the conditional expression (1), even in a zoom lens of a great zoom ratio, the fluctuation of chromatic aberration of magnification is preferably corrected by a small number of lenses.

High dispersion glass is used as the material of the lens GFa on the foremost side, and low dispersion glass is used as the material of the lens GRb on the rearmost side. In the lens GFa on the foremost side, a change in the incidence height of a ray of light at a great image height becomes great from the wide angle end to the telephoto end and therefore, chromatic aberration of magnification of a high order occurring under is generated greatly at the wide angle end and small at the telephoto end. At this time, the conditional expression (1) is satisfied, whereby chromatic aberration of magnification of a high order in the under direction can be generated so as to negate chromatic aberration of magnification of a high order in the over direction in conformity with zooming, and suitable chromatic aberration of magnification is corrected by a small number of constituent lenses.

At this time, it is preferable to set the upper limit value of the conditional expression (1) so as to satisfy the condition that $$vdR - vdF < 50. \quad (1a)$$

According to this, it becomes easy to correct chromatic aberration of magnification better over the whole of the projection distance.

Also, in order to make the rear side telecentric, it is preferable to satisfy the condition that $$7.0 < |DP/fw| \quad (2),$$

where DP represents the distance from a position at which image information on the rear side (reduction side conjugate position) is disposed to an exit pupil, and fw represents the focal length of the entire system at the wide angle end. It is more preferable that the value of the conditional expression (2) be greater than 10.0. Also, it is desirable that |DP/fw| be 100 or less, and preferably less than 20.

If the conditional expression (2) is not satisfied, telecentricity becomes bad, the brightness of each color becomes different depending on an angle of view when the present invention is applied to a color projector, and this is not good.

In each embodiment, each element is constructed as described above, to thereby realize a zoom lens suitable for use in a projector which is small in the fluctuations in aberrations due to focusing, and is small in the fluctuation in chromatic aberration of magnification during zooming.

Also, an image projection apparatus according to the present embodiment has any one of the aforementioned zoom lenses, and a display unit for forming an original image, and projects the original image formed by the display unit onto a screen surface (a projection surface, and of course, in the case of a rear projection type, desirably an image plane or a screen surface having a lenticular lens or the like and having the action of diffusing incident light) by the aforementioned zoom lens.

The drawings referred to in the present embodiment will now be briefly described.

Figure 2:
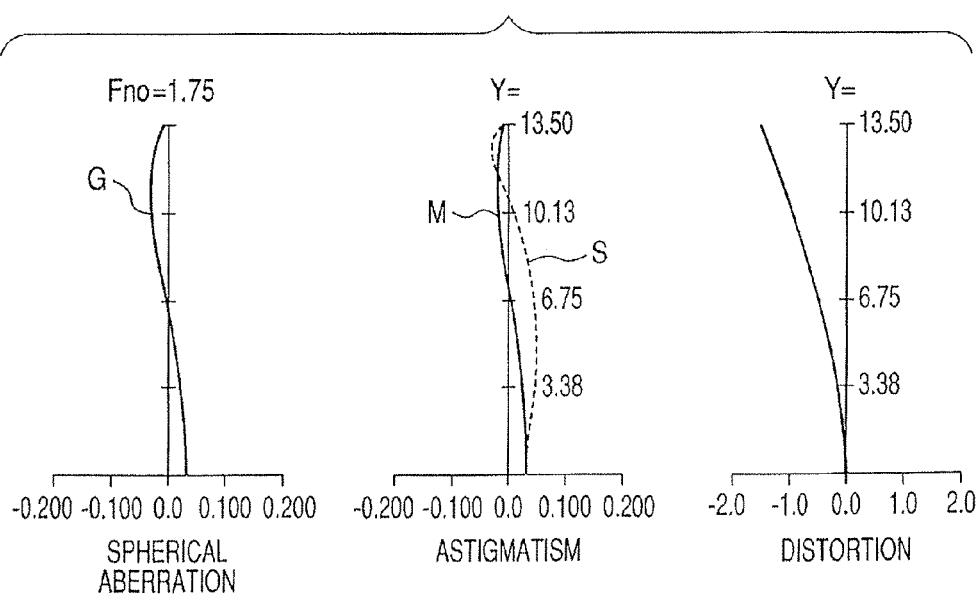
FIG. 2 shows aberrations at the wide angle end of a zoom lens according to Numerical Embodiment 1.
Figure 3:
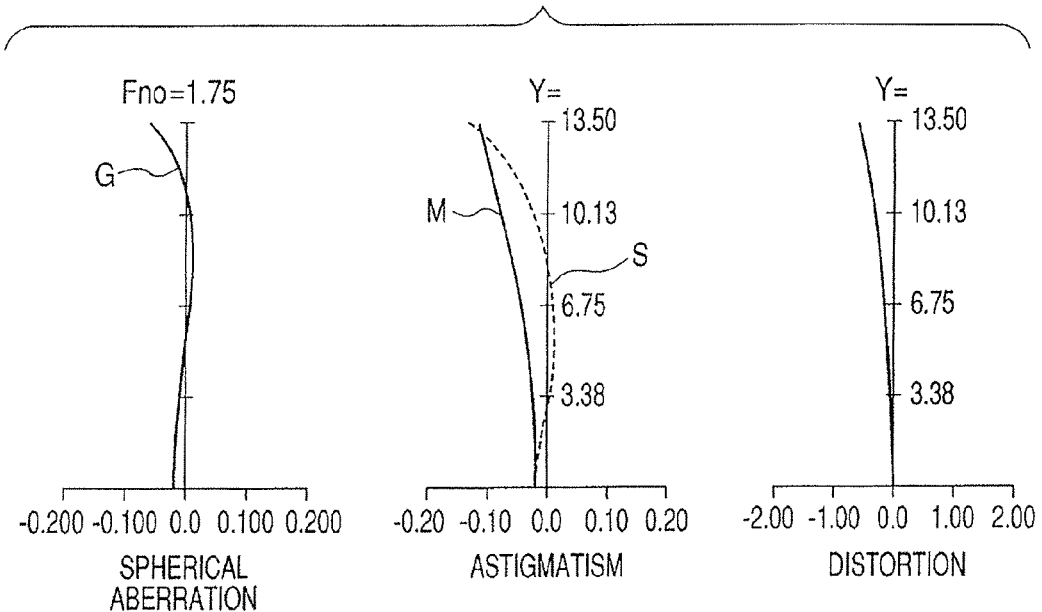
FIG. 3 shows aberrations at the telephoto end of the zoom lens according to Numerical Embodiment 1.

FIG. 1 is a schematic view of the essential portions of an image projection apparatus (liquid crystal video projector) using a zoom lens according to Embodiment 1. FIGS. 2 and 3 show aberrations at the wide angle end (short focal length side) and the telephoto end (long focal length side), respectively, in a case of an object distance (the distance from the first lens unit) being 1.7 m when the numerical values of Numerical Embodiment 1 to be described later corresponding to Embodiment 1 of the present invention are represented by the unit of mm.

Figure 4A:
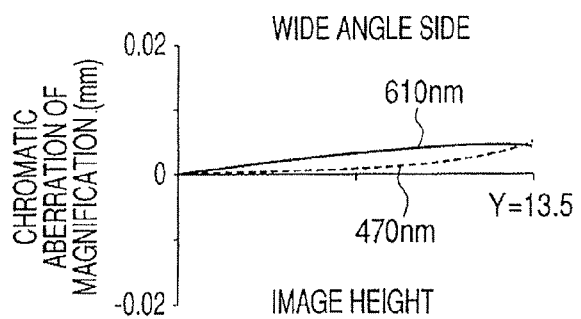
FIGS. 4A and 4B show the chromatic aberration of magnification of the zoom lens according to Numerical Embodiment 1.
Figure 4B:
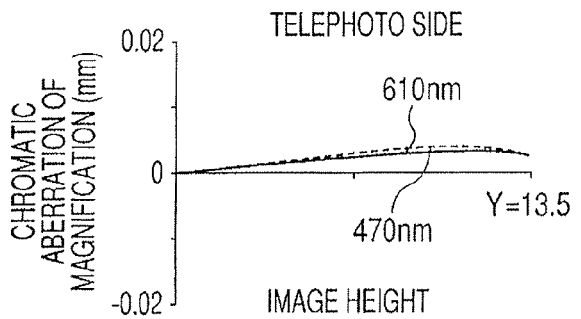

FIGS. 4A and 4B show chromatic aberrations of magnification of a wavelength 610 nm (red) and a wavelength 470 nm (blue) relative to the wavelength 550 nm of Numerical Embodiment 1, at the wide angle end and the telephoto end, respectively, at each image height Y when the object distance is 1.7 m.

Figure 5:
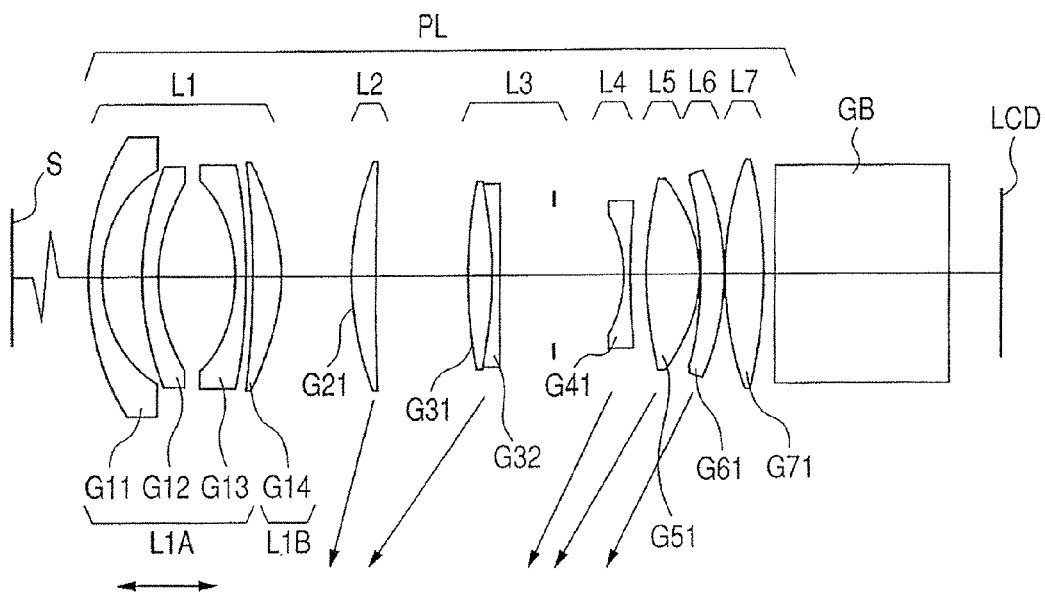
FIG. 5 is a schematic view of the essential portions of an image projection apparatus using a zoom lens according to Embodiment 2.
Figure 6:
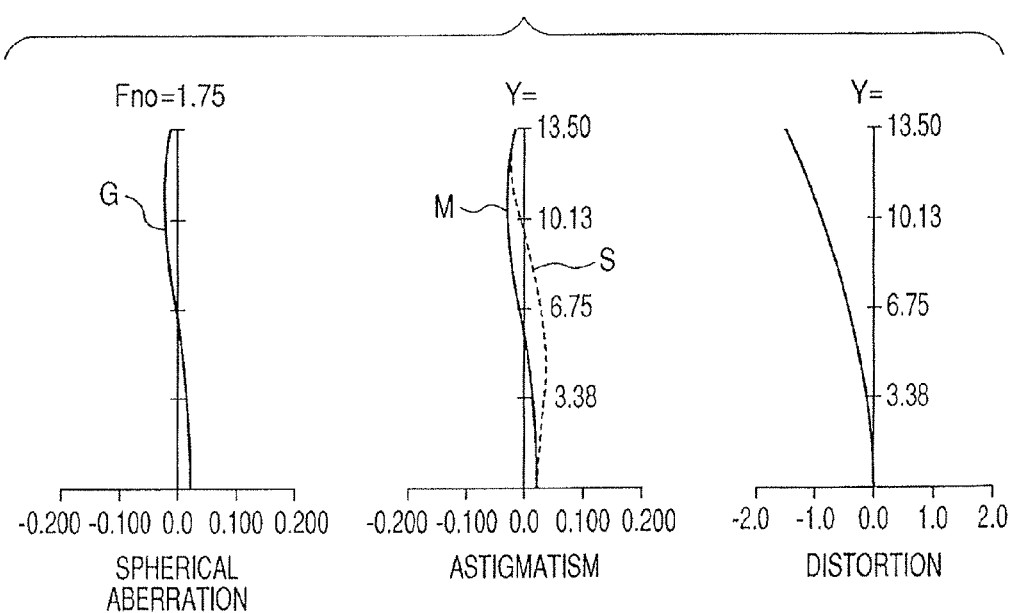
FIG. 6 shows aberrations at the wide angle end of a zoom lens according to Numerical Embodiment 2.
Figure 7:
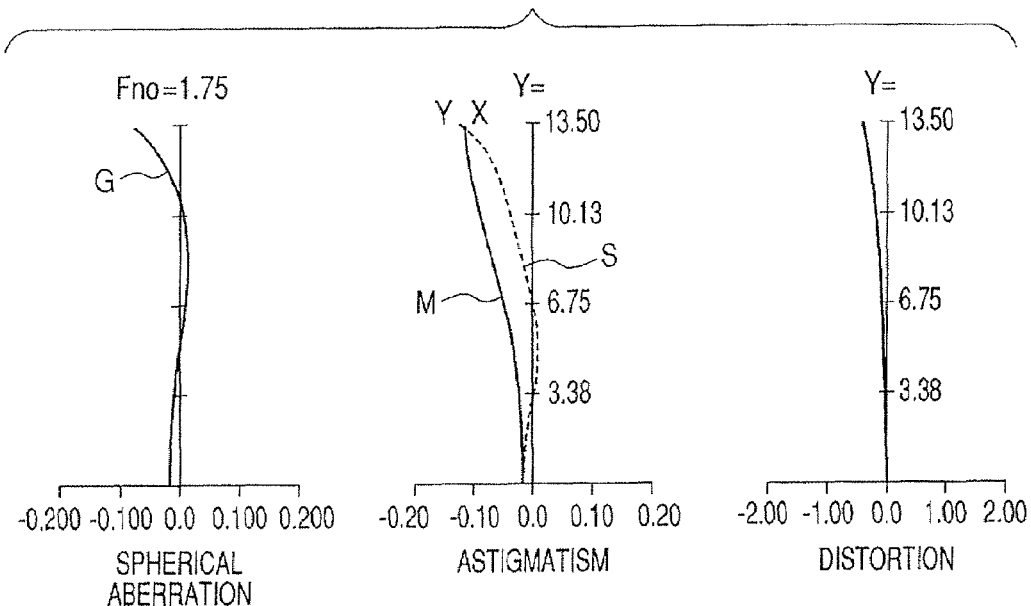
FIG. 7 shows aberrations at the telephoto end of the zoom lens according to Numerical Embodiment 2.

FIG. 5 is a schematic view of the essential portions of an image projection apparatus using a zoom lens according to Embodiment 2 of the present invention. FIGS. 6 and 7 show aberrations at the wide angle end and the telephoto end, respectively, in a case of the object distance being 1.7 m when the numerical values of Numerical Embodiment 2 to be described later corresponding to Embodiment 2 of the present invention are represented by the unit of mm.

Figure 8:
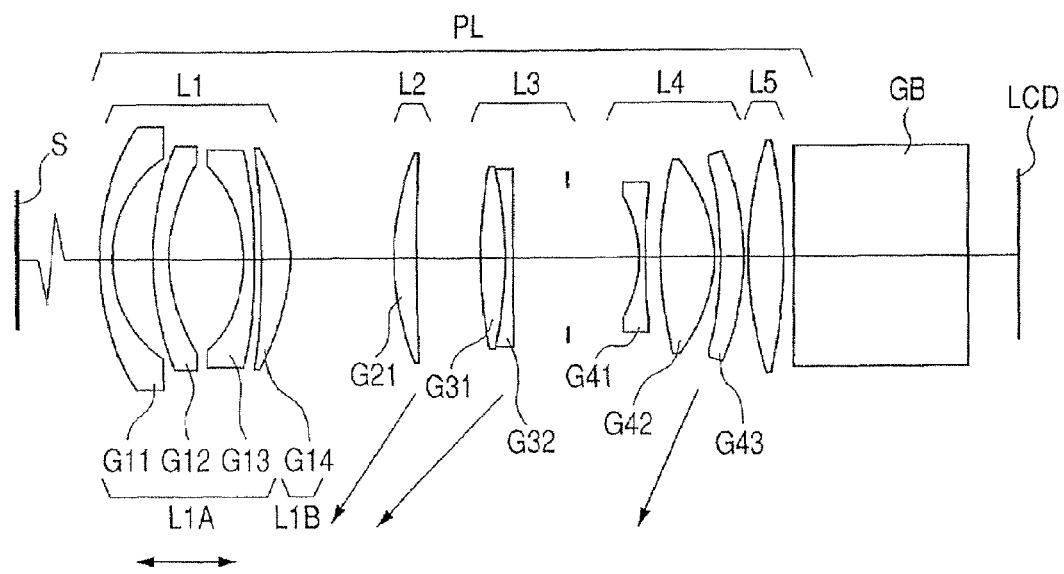
FIG. 8 is a schematic view of the essential portions of an image projection apparatus using a zoom lens according to Embodiment 3.

FIG. 8 is a schematic view of the essential portions of an image projection apparatus using a zoom lens according to Embodiment 3 of the present invention. FIGS. 9 and 10 show aberrations at the wide angle end and the telephoto end, respectively, in a case of the object distance being 1.7 m when the numerical values of Numerical Embodiment to be described later corresponding to Embodiment 3 of the present invention are represented by the unit of mm.

FIGS. 1, 5 and 8 show the image projection apparatuses according to embodiments 1 to 3 in which the original image (projected image) on an LCD is enlarged and projected onto a screen surface S by the use of the zoom lens (projection lens) PL.

The letter S designates a screen surface (projection surface), and LCD denotes the original image (projected image) of a liquid crystal panel (liquid crystal display element) or the like. The screen surface S and the original image LCD are in a conjugate relation with each other, and generally the screen surface S corresponds to the enlargement side (forward) at a conjugate point at a longer distance (first conjugate point), and the original image LCD corresponds to the reduction side (rearward) at a conjugate point at a shorter distance (second conjugate point). When the zoom lens is used as a photographing system, the screen surface S side corresponds to the object side, and the original image LCD side corresponds to the image side.

GB designates a glass block (prism) provided in optical design correspondingly to a color combining prism or a polarizing filter and a color filter or the like.

The zoom lens PL is mounted on a liquid crystal video projector main body (not shown) through a connecting member (not shown). The liquid crystal display element LCD side subsequent to the glass block GB is included in the projector main body.

The zoom lenses according to Embodiments 1 to 3 have F number 1.75, and project the image information onto a 100 inch type screen surface at a short projection distance of 2.5 m (when the numerical embodiments are represented by the unit of mm).

In the aberration graphs of FIGS. 2, 3, 6, 7, 8 and 9, G indicates an aberration at a wavelength 550 nm, and both of S (the inclination of a sagittal image plane) and M (the inclination of a meridional image plane) indicate aberrations at a wavelength 550 nm. Fno is F number. W is a half angle of view, and Y is an image height (image height on the projected side).

Description will now be made of the details of the zoom lens according to each embodiment.

In Embodiment 1 of FIG. 1, L1 designates a first lens unit having negative refractive power, L2 denotes a second lens unit having positive refractive power, L3 designates a third lens unit having positive refractive power, L4 denotes a fourth lens unit having negative refractive power, L5 designates a fifth lens unit having positive refractive power, and L6 denotes a sixth lens unit having positive refractive power.

The first lens unit L1 has a 1A-th lens unit L1A having negative refractive power, and a 1B-th lens unit L1B having positive refractive power.

In Embodiment 1, during zooming (magnification) from the wide angle end to the telephoto end, the second lens unit L2, the third lens unit L3, the fourth lens unit L4 and the fifth lens unit L5 are independently moved to a first conjugate point side (the screen S side) which is the enlargement side as indicated by arrows.

The first lens unit L1 and the sixth lens unit L6 are not moved for zooming. The 1A-th lens unit L1A having negative refractive power in the first lens unit L1 is moved on the optical axis thereof to thereby effect focusing. The 1B-th lens unit L1B is immovable for focusing.

An aperture stop SP is provided between the third lens unit L3 and the fourth lens unit L4, and is moved with the third lens unit L3 during zooming. A multi-layer coat for preventing reflection is provided on each lens surface.

In Embodiment 1, in succession from the object side to the image side, the 1A-th lens unit L1A comprises a negative lens G11, a negative lens G12 of which the two lens surfaces are of an aspherical shape, and a negative lens G13, and the 1B-th lens unit L1B comprises a positive lens G14 of which the rear surface is of a convex shape. Here, the 1A-th lens unit is composed of three negative lenses, but of course may be composed of a negative lens, or may be composed of two, four or more negative lenses. That is, the 1A-th lens unit L1A can be composed of only negative lenses. However, from the viewpoints of the suppression of the aberrations of the entire system and the downsizing of the entire system, it may be composed of two or more and five or less negative lenses, and preferably of three or more negative lenses. Also, the 1B-th lens unit may be composed of two positive lenses. Also, a lens (optical element) having substantially no refractive power (having no optical power) may be disposed more adjacent to the enlargement conjugate side than the 1A-th lens unit L1A. It is desirable that the focal length of this lens disposed more adjacent to the enlargement conjugate side than the 1A-th lens unit L1A be 20 times (preferably 100 times) as great as the focal length of the zoom lens at the wide end thereof or greater.

The second lens unit L2 comprises a positive lens G21 of which the front surface is of a convex shape.

The third lens unit L3 comprises a cemented lens comprising a positive lens G31 and a negative lens G32.

The fourth lens unit L4 comprises a negative lens G41 of which the two lens surfaces are of a concave shape.

The fifth lens unit L5 comprises a positive lens G51 of which the two lens surfaces are of a convex shape, and a positive lens G52 of which the rear surface is of a convex shape.

The two lens surfaces of the positive lens G52 are of an aspherical shape.

The sixth lens unit L6 comprises a positive lens G61 of which the two lens surfaces are of a convex shape.

In Embodiment 1, design is made such that during focusing, only the lens elements having negative refractive power in the first lens unit L1 are moved. Thereby, the refractive power (negative) of the moved elements during focusing becomes greater than that of the entire first lens unit L1, and the movement amount can be more decreased than that in a case where focusing is effected by the entire first lens unit L1 and in accordance therewith, the fluctuations of aberrations are decreased. Also, the three negative lenses G11 to G13 constituting the moved elements during focusing are collectively moved to the enlargement side and therefore, the construction of a lens barrel can be realized easily.

In Embodiment 2 shown in FIG. 5, L1 designates a first lens unit having negative refractive power, L2 denotes a second lens unit having positive refractive power, L3 designates a third lens unit having positive refractive power, L4 denotes a fourth lens unit having negative refractive power, L5 designates a fifth lens unit having positive refractive power, L6 denotes a sixth lens unit having positive refractive power, and L7 designates a seventh lens unit having positive refractive power.

The first lens unit L1 has a 1A-th lens unit L1A having negative refractive power, and a 1B-th lens unit L1B having positive refractive power.

In Embodiment 2, during zooming (magnification) from the wide angle end to the telephoto end, the second lens unit L2, the third lens unit L3, the fourth lens unit L4, the fifth lens unit L5 and the sixth lens unit L6 are independently moved to the first conjugate point side (the screen S side) which is the enlargement side, as indicated by arrows. Here, the first lens unit L1 may also be moved during zooming. This also holds true of the other embodiments.

The first lens unit L1 and the seventh lens unit L7 are not moved for zooming. The 1A-th lens unit L1A having negative refractive power in the first lens unit L1 is moved on the optical axis thereof to thereby effect focusing. The 1B-th lens unit L1B is immovable for focusing.

An aperture stop SP is provided between the third lens unit L3 and the fourth lens unit L4, and is moved with the third lens unit L3 during zooming. A multi-layer coat for preventing reflection is provided on each lens surface.

In Embodiment 2, in succession from the object side to the image side, the 1A-th lens unit L1A comprises a negative lens G11, a negative lens G12 of which the two lens surfaces are of an aspherical shape, and a negative lens G13, and the 1B-th lens unit L1B comprises a positive lens G14 of which the rear surface is of a convex shape. Here, the 1A-th lens unit composed of three negative lenses, but of course, may be comprised a negative lens, or may be composed of two, four or more negative lenses. That is, the 1A-th lens unit L1A can be composed of only negative lenses. However, from the viewpoints of the suppression of the aberrations of the entire system and the downsizing of the entire system, it is preferable that the 1A-th lens unit L1A be composed of two or more and five or less negative lenses, or preferably of three or more negative lenses. The 1B-th lens unit may also be composed of two positive lenses. Also, a lens (optical element) having substantially no refractive power (having no optical power) may be disposed more adjacent to the enlargement conjugate side than the 1A-th lens unit L1A. It is desirable that the focal length of this lens disposed more adjacent to the enlargement conjugate side than the 1A-th lens-unit L1A be 20 times (preferably 100 times) as great as the focal length of the zoom lens at the wide end thereof or greater.

The second lens unit L2 comprises a positive lens G21 of which the front surface is of a convex surface. The third lens unit L3 comprises a cemented lens comprising a positive lens G31 and a negative lens G32. The fourth lens L4 comprises a negative lens G41 of which the two lens surfaces are of a concave shape. The fifth lens unit L5 comprises a positive lens G51 of which the two lens surfaces are of a convex shape. The sixth lens unit L6 comprises a positive lens G61 of which the rear surface is of a convex shape.

The two lens surfaces of the positive lens G61 are of an aspherical shape.

The seventh lens unit L7 comprises a positive lens G71 of which the two lens surfaces are of a convex shape.

In Embodiment 2, the zoom lens as a whole is composed of seven lens units, and the fluctuations of aberrations are made small with zooming. The optical action when focusing is effected by the 1A-th lens unit L1A is the same as that in Embodiment 1.

In Embodiment 3 shown in FIG. 8, L1 designates a first lens unit having negative refractive power, L2 denotes a second lens unit having positive refractive power, L3 designates a third lens unit having positive refractive power, L4 denotes a fourth lens unit having positive refractive power, and L5 designates a fifth lens unit having positive refractive power. The first lens unit L1 has a 1A-th lens unit L1A having negative refractive power and a 1B-th lens unit L1B having positive refractive power.

In Embodiment 3, during zooming (magnification) from the wide angle end to the telephoto end, the second lens unit L2, the third lens unit L3 and the fourth lens unit L4 are independently moved to the first conjugate point side (the screen S side) which is the enlargement side, as indicated by arrows.

The first lens unit L1 and the fifth lens unit L5 are not moved for zooming. The 1A-th lens unit L1A having negative refractive power in the first lens unit L1 is moved on the optical axis thereof to thereby effect focusing. The 1B-th lens unit L1B is immovable for focusing.

An aperture stop SP is provided between the third lens unit L3 and the fourth lens unit L4, and is moved with the third lens unit L3 during zooming. A multi-layer coat for preventing reflection is provided on each lens surface.

In Embodiment 3, in succession from the object side to the image side, the 1A-th lens unit L1A comprises a negative lens G11, a negative lens G12 of which the two lens surfaces are of an aspherical shape, and a negative lens G13, and the 1B-th lens unit L1B comprises a positive lens G14 of which the rear surface is of a convex shape. Here, the 1A-th lens unit is composed of three negative lenses, but of course, may be composed of a negative lens, or may be composed of two, four or more negative lenses. That is, the 1A-th lens unit can be composed of only negative lenses. However, from the viewpoints of the suppression of the aberrations of the entire system and the downsizing of the entire system, it is preferable that the 1A-th lens unit L1A be composed of two or more and five or less negative lenses, and preferably of three or more negative lenses. The 1B-th lens unit may also be composed of two positive lenses. Also, a lens (optical element) having substantially no refractive power (having no optical power) may be disposed more adjacent to the enlargement conjugate point side than the 1A-th lens unit L1A. It is desirable that the focal length of this lens disposed more adjacent to the enlargement conjugate point side than the 1A-th lens unit L1A be 20 times (preferably 100 times) as great as the focal length of the zoom lens at the wide end thereof or greater.

The second lens unit L2 comprises a positive lens of which the front surface is of a convex shape. The third lens unit L3 comprises a cemented lens comprising a positive lens G31 and a negative lens G32. The fourth lens unit L4 comprises a negative lens G41 of which the two lens surfaces are of a concave shape, a positive lens G42 of which the two lens surfaces are of a convex shape, and a positive lens G43 of which the rear surface is of a convex shape.

The two lens surfaces of the positive lens G43 are of an aspherical shape.

The fifth lens unit L5 comprises a positive lens G51 of which the two lens surfaces are of a convex shape.

In Embodiment 3, the zoom lens as a whole is composed of five lens units, and the mutual mounting error of the negative lens G41 and positive lens G42 which are relatively high in degree of eccentricity deviance is decreased. Thereby the manufacture of the zoom lens is made easy. The optical action when focusing is effected by the 1A-th lens unit L1A is the same as that in Embodiment 1.

Figure 11:
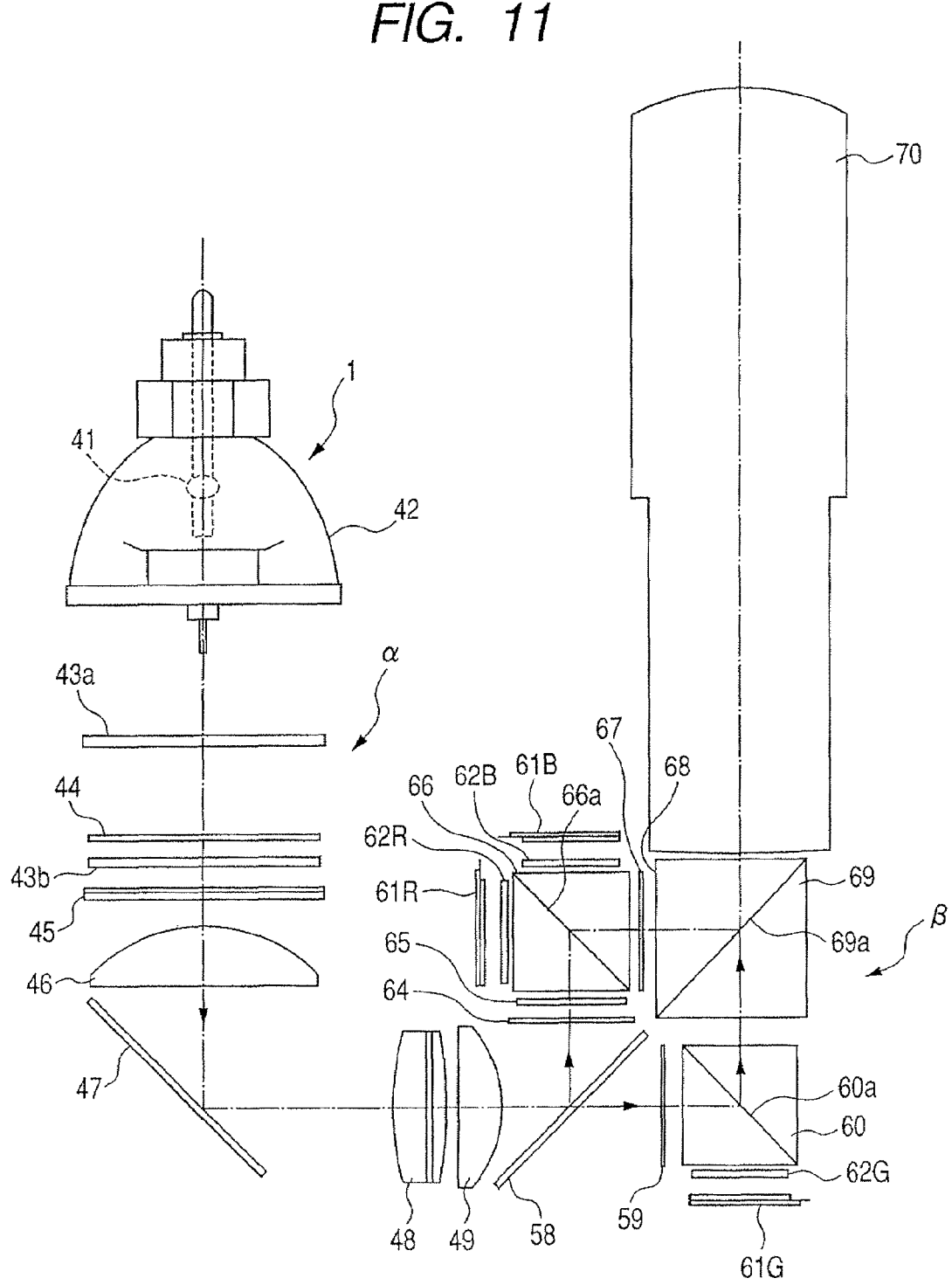
FIG. 11 is an illustration of the optical system of a projection type image display apparatus according to the present embodiment.

Reference is now had to FIG. 11 to describe a projection type image display apparatus using any one of the zoom lenses described above in Embodiments 1 to 3 as a projection lens (projection optical system). Here, the optical construction of a projection type image display apparatus carrying thereon a reflection type liquid crystal display element (use may be made of an image forming element such as a reflection type liquid crystal panel or of course, a projection type liquid crystal panel) composed of a lamp 1, an illuminating optical system α, a color separating and combining optical system β and a projection lens optical system 70 (see FIG. 1) in a projection lens barrel 5 will be described with reference to FIG. 11.

In FIG. 11, the reference numeral 41 designates a light emitting tube emitting white light with continuous spectrum, and the reference numeral 42 denotes a reflector for condensing the light from the light emitting tube 41 in a predetermined direction, and the light emitting tube 41 and the reflector 42 together form an element of the lamp 1.

The reference character 43a denotes a first cylinder array composed of a lens array in which a plurality of cylindrical lenses having refractive power in a vertical direction (a direction perpendicular to the plane of the drawing sheet of FIG. 11) in the direction of travel of the light from the lamp 1, the reference character 43b designates a second cylinder array composed of a lens array comprising cylindrical lenses corresponding to the individual cylindrical lenses of the first cylinder array 43a, the reference numeral 44 denotes an ultraviolet ray absorbing filter, and the reference numeral 45 designates a polarized light converting element for properly arranging non-polarized light into predetermined polarized light and emitting it.

The reference numeral 46 denotes a front compressor composed of a cylindrical lens having refractive power in a horizontal direction (in the plane of the drawing sheet of FIG. 11), the reference numeral 47 designates a mirror for changing the optical axis by 90 degrees, the reference numeral 48 denotes a condenser lens, and the reference numeral 49 designates a rear compressor composed of a cylindrical lens having refractive power in the horizontal direction.

Each element described above constitutes an element of the illuminating optical system α.

The reference numeral 58 denotes a dichroic mirror for reflecting lights of blue (B) and red (R) wavelength ranges, and transmitting light of green (G) wavelength range therethrough. The reference numeral 59 designates an incidence side polarizing plate comprising a transparent substrate and a polarizing element stuck thereon, and it transmits only S-polarized light therethrough. The reference numeral 60 denotes a first polarized beam splitter for transmitting P-polarized light therethrough and reflecting the S-polarized light, and having a polarized light separating surface 60*a*.

The reference characters 61R, 61G and 61B designate a reflection type liquid crystal display element (TN type liquid crystal and other liquid crystal display elements are the same as this) for red (R) for reflecting incident light and modulating an image, a reflection type liquid crystal display element for green (G), and a reflection type liquid crystal display element for blue (B), respectively.

The reference characters 62R, 62G and 62B denote a quarter wavelength plate for red, a quarter wavelength plate for green and a quarter wavelength plate for blue, respectively. The reference numeral 64 designates an incidence side polarizing plate for R and B comprising a transparent substrate and a polarizing element stuck thereon, and it transmits only the S-polarized light therethrough. The reference numeral 65 denotes a first color selective phase difference plate which changes the polarization direction of the light B by 90 degrees, and does not change the polarization direction of the light R. The reference numeral 66 designates a second polarized beam splitter for transmitting the P-polarized light therethrough, and reflecting the S-polarized light, and having a polarized light separating surface 66*a*.

The reference numeral 67 denotes a second color selective phase difference plate which changes the polarization direction of the light R by 90 degrees, and does not change the polarization direction of the light B.

The reference numeral 68 designates an emergence side polarizing plate (polarizing element) for R and B, which transmits only the S-polarized light. The reference numeral 69 denotes a third polarized beam splitter (color combining means) for transmitting the P-polarized light therethrough, and reflecting the S-polarized light, and having a polarized light separating surface 69*a*.

Each of the members from the dichroic mirror 58 to the third polarized beam splitter 69 constitutes an element of the color separating and combining optical system β.

The reference numeral 70 designates a projection lens optical system. An image display optical system is constituted by the illuminating optical system α, the color separating and combining optical system β and the projection lens optical system 70.

Optical action will now be described.

The light emitted from the light emitting tube 41 is condensed in a predetermined direction by the reflector 42. The reflecting surface of the reflector 42 has a parabolic surface shape, and the light from the parabolic surface becomes a light beam parallel to the symmetry axis (optical axis) of the parabolic surface. However, the light beam from the light emitting tube 41 is not a light beam from an ideal point light source, but the light emitting tube 41 has a light emitting portion of a finite size and therefore, the light beam to be condensed also includes much of a component of light which is not parallel to the symmetry axis of the parabolic surface.

These light beams are incident on the first cylinder array 43*a*. The light beams incident on the first cylinder array 43*a* are divided into a plurality of light beams conforming to the respective cylinder lenses and are condensed (a plurality of light beams band-shaped in the horizontal direction), and form a plurality of light beams (a plurality of light beams band-shaped in the horizontal direction) near the polarized light converting element 45 through the ultraviolet ray absorbing filter 44 and via the second cylinder array 43*b*.

The polarized light converting element 45 comprises a plurality of polarized light separating surfaces arranged in a vertical direction, a reflecting surface and a half wavelength plate, and the plurality of light beams are incident on the polarized light separating surfaces corresponding to the row thereof, and are divided into light of a transmitted P-polarized component and light of a reflected S-polarized component.

The light of the reflected S-polarized component is reflected by the reflecting surface, and emerges in the same direction as the P-polarized component. On the other hand, the light of the transmitted P-polarized component is transmitted through the half wavelength plate and is converted into the same polarized component as the S-polarized component, and emerges as light having had its polarization direction regularized. The plurality of polarization-converted light beams (the plurality of light beams band-shaped in the horizontal direction) are reflected by 90 degrees by the reflecting mirror 47 through the front compressor 46 after they have emerged from the polarized light converting element 45, and come to the condenser lens 48 and the rear compressor 49.

Here, the optical action of the front compressor 46, the condenser lens 48 and the rear compressor 49 is set appropriately. The plurality of light beams assume a shape in which rectangular images overlap one another, and form a rectangular uniform illuminating area.

Reflection type liquid crystal display elements 61R, 61G and 61G which will be described later are disposed in this illuminating area. Next, the light made into the S-polarized light by the polarized light converting element 45 is incident on the dichroic mirror 58. The dichroic mirror 58 reflects light B (wavelength 430 to 495 nm) and light R (wavelength 590 to 650 nm) and transmits light G (wavelength 505 to 580 nm) therethrough.

The optical path of the light G will now be described.

The light G transmitted through the dichroic mirror 58 is incident on the incidence side polarizing plate 59. The light G is the S-polarized light still after separated by the dichroic mirror 58. The light G, after it has emerged from the incidence side polarizing plate 59, is incident on the first polarized beam splitter 60 as the S-polarized light and is reflected by the polarized light separating surface, and comes to the reflection type liquid crystal display element 61G for G. In the reflection type liquid crystal display element 61G for G, the light G is image-modulated and reflected. Of the reflected light G image-modulated, an S-polarized component is again reflected by the polarized light separating surface 60*a* of the first polarized beam splitter 60, is returned to the light source 1 side and is removed from the projected light.

On the other hand, of the reflected light of the image-modulated light G, a P-polarized component is transmitted through the polarized light separating surface 60*a* of the first polarized beam splitter 60, and travels toward the third polarized beam splitter 69 as the projected light.

At this time, in a state in which all the polarized components have been converted into the S-polarized light (a state in which black is displayed), the slow axis of the quarter wavelength plate 62G provided between the first polarized beam splitter 60 and the reflection type liquid crystal display element 61G for the light G is adjusted to a predetermined direction, whereby the influence of the disturbance of the polarized state occurring in the first polarized beam splitter 60 and the reflection type liquid crystal display element 61G for G can be suppressed to a small level.

The light G having emerged from the first polarized beam splitter 60 is incident on the third polarized beam splitter 69 as P-polarized light, is transmitted through the polarized light separating surface 69*a* of the third polarized beam splitter 69 and comes to the projection lens 70.

On the other hand, the light R and the light B reflected by the dichroic mirror 58 are incident on the incidence side polarizing plate 64. The light R and the light B are S-polarized light still after separated by the dichroic mirror 58. Then, the light R and the light B emerge from the incidence side polarizing plate 64, and thereafter are incident on the first color selective phase difference plate 65. The first color selective phase difference plate 65 has the action of rotating the polarization direction of only the light B by 90 degrees, whereby the light B and the light R are incident on the second polarized beam splitter 66 as P-polarized light and S-polarized light, respectively. The light R incident on the second polarized beam splitter 66 as the S-polarized light is reflected by the polarized light separating surface of the second polarized beam splitter 66, and comes to the reflection type liquid crystal display element 61R for the light R. Also, the light B incident on the second polarized beam splitter 66 as the P-polarized light is transmitted through the polarized light separating surface 66*a* of the second polarized beam splitter 66 and comes to the reflection type liquid crystal display element 61B for the light B.

The light R incident on the reflection type liquid crystal display element 61R for the light R is image-modulated and reflected. Of the reflected light of the image-modulated light R, the S-polarized component is again reflected by the polarized light separating surface 66*a* of the second polarized beam splitter 66 and is returned to the light source 1 side, and is removed from the projected light. On the other hand, of the reflected light of the image-modulated light R, the P-polarized component is transmitted through the polarized light separating surface 66*a* of the second polarized beam splitter 66 and travels toward the second color selective phase plate 67 as the projected light.

Also, the light B incident on the reflection type liquid crystal display element 61B for the light B is image-modulated and reflected. Of the reflected light of the image-modulated light B, the P-polarized component is again transmitted through the polarized light separating surface 66*a* of the second polarized beam splitter 66 and is returned to the light source 1 side, and is removed from the projected light.

On the other hand, of the reflected light of the image-modulated light B, the S-polarized component is reflected by the polarized light separating surface 66*a* of the second polarized beam splitter 66 and travels toward the color selective phase plate 67 as the projected light.

At this time, by adjusting the slow axes of the quarter wavelength plates 62R and 62B provided between the second polarized beam splitter 66 and the reflection type liquid crystal display elements 61R and 61B for the light R and the light B, respectively, it is possible to effect the adjustment of the display of the black of the light R and the light B as in the case of the light G.

Of the projected light of the light R and the light B thus combined into a light beam, and having emerged from the second polarized beam splitter 66, the light R has its polarization direction rotated by 90 degrees by the second color selective phase plate 67 and becomes an S-polarized component, and is further analyzed by the emergence side polarizing plate 68 and is incident on the third polarized beam splitter 69.

Also, the light B is intactly transmitted through the second color selective phase plate 67 as the S-polarized light, and is further analyzed by the emergence side polarizing plate 68 and is incident on the third polarized beam splitter 69. By being analyzed by the emergence side polarizing plate 68, the projected light of the light R and the light B become lights having had its ineffective component cut, where the ineffective component is generated by passing through the second polarized beam splitter 66, the reflection type liquid crystal display elements 61R and 61B and the quarter wavelength plates 62R and 62B for respectively the light R and the light B.

Then, the projected light of the light R and the light B incident on the third polarized beam splitter 69 is reflected by the polarized light separating surface 69*a* of the third polarized beam splitter 69, and is combined with the light G transmitted through the aforementioned polarized light separating surface 69*a* and comes to the projection lens 70.

Then, the projected light of the combined light R, light G and light B is enlarged and projected onto a projection surface such as a screen by the projection lens 70.

The above-described optical paths are those in a case where the reflection type liquid crystal display element effects white display and therefore, description will hereinafter be made of optical paths in a case where the reflection type liquid crystal display element effects black display.

The optical path of the light G will first be described.

The S-polarized light of the light G transmitted through the dichroic mirror 58 is incident on the incidence side polarizing plate 59, and thereafter is incident on the first polarized beam splitter 60, is reflected by the polarized light separating surface 60*a* and comes to the reflection type liquid crystal display element 61G for the light G. However, the reflection type liquid crystal display element 61G effects black display and therefore, the light G is reflected while remaining not image-modulated.

Accordingly, the light G is still the S-polarized light after reflected by the reflection type liquid crystal display element 61G and therefore, is again reflected by the polarized light separating surface 60*a* of the first polarized beam splitter 60, is transmitted through the incidence side polarizing plate 59 and is returned to the light source 1 side, and is removed from the projected light.

Description will now be made of the optical paths of the light R and the light B.

The S-polarized lights of the light R and the light B reflected by the dichroic mirror 58 are incident on the incidence side polarizing plate 64. Then, the light R and the light B emerge from the incidence side polarizing plate 64, and thereafter are incident on the first color selective phase difference plate 65. The first color selective phase difference plate 55 has the action of rotating the polarization direction of only the light B by 90 degrees, whereby the light B and the light R are incident on the second polarized beam splitter 66 as P-polarized light and S-polarized light, respectively.

The light R incident on the second polarized beam splitter 66 as the S-polarized light is reflected by the polarized light separating surface 66*a* of the second polarized beam splitter 66, and comes to the reflection type liquid crystal display element 61R for the light R. Also, the light B incident on the second polarized beam splitter 66 as the P-polarized light is transmitted through the polarized light separating surface 66*a* of the second polarized beam splitter 66 and comes to the reflection type liquid crystal display element 61B for the light B.

Here, the reflection type liquid crystal display element 61R for the light R effects black display and therefore, the light R incident on the reflection type liquid crystal display element 61R for the light R is reflected while remaining not image-modulated. Accordingly, the light R is the S-polarized light still after reflected by the reflection type liquid crystal display element 61R for the light R and therefore, is again reflected by the polarized light separating surface 66a of the second polarized beam splitter 66, passes through the incidence side polarizing plate 64 and is returned to the light source 1 side, and is removed from the projected light and thus, becomes black display.

On the other hand, the light B incident on the reflection type liquid crystal display element 61B for the light B is reflected while remaining not image-modulated because the reflection type liquid crystal display element 61B for the light B effects black display. Accordingly, the light B is the P-polarized light still after reflected by the reflection type liquid crystal display element 61B for the light B and therefore, is again transmitted through the polarized light separating surface 66a of the second polarized beam splitter 66, is converted into S-polarized light by the first color selective phase difference plate 65, is transmitted through the incidence side polarizing plate 64, is returned to the light source 1 side and is removed from the projected light.

Here, it is desirable in the characteristic of the polarized beam splitter that the refractive index of the glass material of the aforementioned first, second and third polarized beam splitters be 1.60 or greater and 1.90 or less (refractive index for light of a wavelength 587.56 nm). The projection lenses (zoom lenses) according to the above-described Embodiments 1 to 5 will be more preferable if applied to a projection type image display apparatus (particularly a reflection type liquid crystal display apparatus using a reflection type liquid crystal panel) which effects color combination (the combination of the optical paths of lights in different wavelength areas) by such a polarized beam splitter (an optical element having such a characteristic as reflects light in a predetermined polarization direction in lights in at least a predetermined wavelength area, preferably lights in the red, green and blue areas, and transmits light in a polarization direction orthogonal to the polarization direction thereof.

The foregoing is the optical construction in the projection type image display apparatus using a reflection type liquid crystal display element (reflection type liquid crystal panel).

A similar effect will be obtained even if a transmission type liquid crystal display element is used instead of the reflection type liquid crystal display element.

Figure 12:
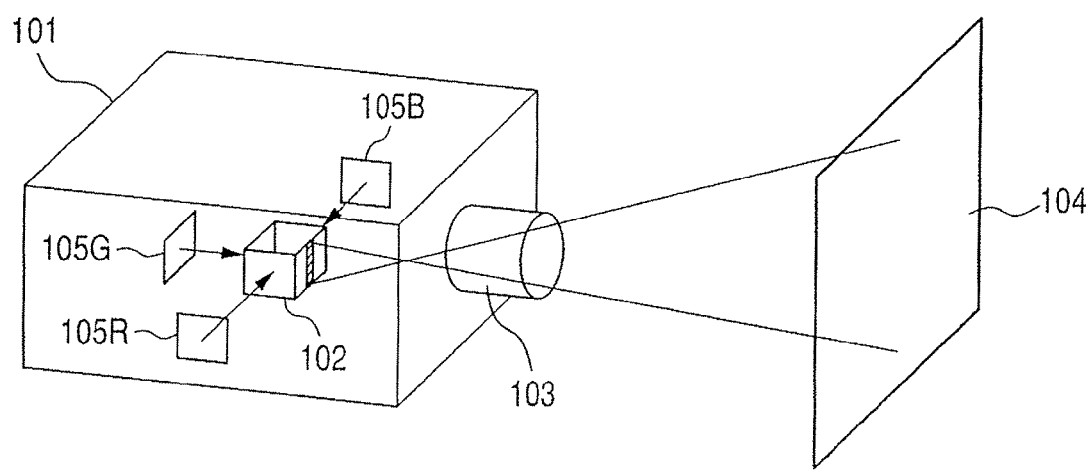
FIG. 12 is a schematic view of the essential portions of a color liquid crystal projector.

FIG. 12 is a schematic view of the essential portions of an embodiment of the image projection apparatus of the present invention.

FIG. 12 shows an image projection apparatus in which the aforementioned zoom lens is applied to a tri-panel type color liquid crystal projector, and the image information of a plurality of color lights based on a plurality of liquid crystal display elements is combined through color combining means and is enlarged and projected onto a screen surface by a projection lens.

In FIG. 12, a color liquid crystal projector 101 combines red, green and blue color lights from three R, G and B liquid crystal panels 105R, 105G and 105B into an optical path by a prism 102 as color combining means, and projects them onto a screen 104 by the use of a projection lens 103 comprising the aforementioned zoom lens.

Numerical Embodiments 1 to 3 corresponding to the zoom lenses according to Embodiments 1 to 3 will be shown below. In each numerical embodiment, i represents the order of optical surfaces from the enlargement side (front side), Ri represents the radius of curvature of the i-th optical surface (the i-th surface), di represents the interval between the i-th surface and the (i+1)th surface, and ni and vi represent the refractive index and the Abbe number, respectively, of the material of the i-th optical member with d-line as the standard. f represents the focal length.

Also, two surfaces on the rearmost side of Numerical Embodiments 1 to 3 are surfaces constituting a glass block GB.

Also, an aspherical shape is represented by $$x=(h^2/R)/[1+[1-(1+k)(h/R)^2]^{1/2}]+Ah^4+Bh^6+Ch^8+Dh^{10}+Eh^{12},$$

where k represents a conic constant, and A, B, C, D and E represent spherical surface coefficients, x represents the displacement in the direction of the optical axis at the position of a height h from the optical axis with the surface vertex as the reference, and R represents the paraxial radius of curvature.

Note that the indication of "e-Z" means "$10^{-Z}$"

The relations among the aforementioned Conditional Expressions 1 to 2 and the numerical values in Numerical Embodiments 1 to 3 are shown in Table 1 below.

| Numerical Embodiment 1 | | | | |
|---|---|---|---|---|
| (A) Lens Data | | | | |
| Surface No. | Radius of curvature R | Surface interval | Refractive index nd | Abbe number vd |
| 1 | 40.00375 | 2.00 | 1.746398 | 27.8 |
| 2 | 20.08345 | 7.11 | | |
| 3 | 84.78046 | 2.50 | 1.531987 | 55.8 |
| 4 | 26.83627 | 12.17 | | |
| 5 | −23.27356 | 1.65 | 1.488976 | 70.2 |
| 6 | −101.45165 | d6 | | |
| 7 | −168.29559 | 4.50 | 1.753999 | 35.3 |
| 8 | −37.25336 | d8 | | |
| 9 | 42.90310 | 3.85 | 1.753999 | 35.3 |
| 10 | 252.62854 | d10 | | |
| 11 | 64.85383 | 3.80 | 1.775817 | 49.6 |
| 12 | −64.85383 | 1.30 | 1.854159 | 23.8 |
| 13 | 2109.01157 | | | |
| 14 | Stop | | | |
| 15 | −20.24525 | 1.15 | 1.746398 | 27.8 |
| 16 | 88.78303 | d16 | | |
| 17 | 56.01143 | 8.60 | 1.488976 | 70.2 |
| 18 | −23.65127 | 0.50 | | |

Numerical Embodiment 1

| | | | | |
|---|---|---|---|---|
| 19 | −182.59351 | 3.55 | 1.531987 | 55.8 |
| 20 | −50.51247 | d20 | | |
| 21 | 48.32359 | 6.35 | 1.488976 | 70.2 |
| 22 | −78.90134 | 1.73 | | |
| 23 | ∞ | 29.20 | 1.518052 | 64.1 |
| 24 | ∞ | 9.1042 | | |
| image plane | | | | |

Aspherical Surface Coefficient

| Surface No. | k | A | B | C | D | E |
|---|---|---|---|---|---|---|
| 3 | 0 | 2.03893e−5 | −6.28981e−8 | 2.15774e−10 | −2.68827e−13 | 7.52135e−17 |
| 4 | 0 | 9.26816e−6 | −7.92267e−8 | 1.70009e−10 | 3.77076e−14 | −9.28005e−16 |
| 19 | 0 | −1.74477e−5 | −2.15534e−8 | −2.18198e−11 | 1.3202e−13 | 9.24183e−16 |
| 20 | 0 | −7.76948e−6 | −1.76136e−8 | 3.25435e−11 | −7.54099e−14 | 1.10428e−15 |

(B) Movement Amount during Zooming

| | f = 20.54 (wide angle) | f = 25.47 ← → | f = 32.05 (telephoto) |
|---|---|---|---|
| d8 | 14.00949 | 5.70622 | 1.22241 |
| d10 | 14.45606 | 9.48876 | 0.70000 |
| d14 | 12.90960 | 18.33358 | 23.89794 |
| d16 | 2.08219 | 1.85866 | 0.70000 |
| d20 | 0.70536 | 8.77547 | 17.64233 |

(C) Movement Amount during Focusing

| | object distance = ∞ | object distance = 7.2 m | object distance = 1.7 m | object distance = 1.0 m |
|---|---|---|---|---|
| d6 | 0.83134 | 0.87340 | 1.00731 | 1.12726 |

Numerical Embodiment 2

(A) Lens Data

| surface No. | radius of curvature R | surface interval d | refractive index nd | Abbe number vd |
|---|---|---|---|---|
| 1 | 37.50919 | 2.30 | 1.746398 | 27.8 |
| 2 | 20.37389 | 7.11 | | |
| 3 | 77.78855 | 2.50 | 1.531987 | 55.8 |
| 4 | 25.91731 | 12.81 | | |
| 5 | −23.44651 | 1.65 | 1.488976 | 70.2 |
| 6 | −125.97711 | d6 | | |
| 7 | −137.07615 | 4.78 | 1.753999 | 35.3 |
| 8 | −37.54786 | d8 | | |
| 9 | 42.84232 | 3.94 | 1.753999 | 35.3 |
| 10 | 253.00296 | d10 | | |
| 11 | 61.97277 | 3.94 | 1.775817 | 49.6 |
| 12 | −61.97277 | 1.30 | 1.854159 | 23.8 |
| 13 | −769.98320 | 9.03 | | |
| 14 | stop | d14 | | |
| 15 | −20.24381 | 1.15 | 1.746398 | 27.8 |
| 16 | 90.95572 | d16 | | |
| 17 | 59.99538 | 8.73 | 1.488976 | 70.2 |
| 18 | −22.65899 | d18 | | |
| 19 | −192.36222 | 3.11 | 1.531987 | 55.8 |
| 20 | −61.14919 | d20 | | |
| 21 | 47.53963 | 6.61 | 1.488976 | 70.2 |
| 22 | −73.61163 | 1.73 | | |
| 23 | ∞ | 29.20 | 1.518052 | 64.1 |
| 24 | ∞ | 9.0925 | | |
| image plane | | | | |

Aspherical Surface Coefficient

TABLE 1

| Conditional Expressions | Embodiment | | |
|---|---|---|---|
| | 1 | 2 | 3 |
| (1) vdR − vdF | 42.4 | 42.4 | 42.4 |
| (2) $\frac{DP}{fw}$ | 8.0 | 7.7 | 8.5 |

According to the present embodiment described above, there is obtained a zoom lens suitable, for example, for use in a liquid crystal projector which achieves the downsizing of an entire lens system, and yet which well corrects various aberrations resulting from focusing, and has good optical performance over the whole of a projection distance.

This application claims priority from Japanese Patent Application No. 2005-045456 filed Feb. 22, 2005, which is hereby incorporated by reference herein.

What is claimed is:

1. A zoom lens comprising:
   a first lens unit which is disposed most adjacent to an enlargement side, has negative refractive power, and doesn't move for zooming;
   a last lens unit disposed most adjacent to a reduction side and having positive refractive power; and
   one or more lens units moved in the direction of the optical axis thereof during zooming;
   wherein a first lens in said first lens units which is disposed most adjacent to the enlargement side within said first lens unit, has negative refractive power,
   the last lens in said last lens units which is disposed most adjacent to the reduction side within said last lens unit, has positive refractive power, and the following condition is satisfied, $32 < vdR - vdF,$ where vdF represents the Abbe number of the material of the first lens and vdR represents the Abbe number of the material of the last lens,
   wherein the following condition is satisfied, $vdR - vdF < 50.$ 2. An image projection apparatus comprising:
   a zoom lens according to claim 1; and
   a display unit for forming an original picture;
   wherein the original picture formed by the display unit is projected onto a projection surface by the zoom lens.

* * * * *